Patented Nov. 20, 1934

1,981,141

UNITED STATES PATENT OFFICE 1,981,141

CEMENTING FOIL AND THIN FILM

Amerigo F. Caprio, Newark, N. J., assignor to Celluloid Corporation, a corporation of New Jersey No Drawing. Application January 29, 1931, Serial No. 512,222

12 Claims. (Cl. 154—40)

The present invention relates to the art of uniting thin films or foils made from or containing a derivative of cellulose and relates more particularly to adhesive for such films or foils.

An object of my invention is the provision of an adhesive for thin films or foils of cellulosic derivatives that provides a firm and permanent bond betwen the cemented surfaces; that will not result in a wrinkled joint; that will exhibit no tendency to loosen or separate under various conditions of temperature and use; that is simple in use, invisible, odorless or substantially so, and that is otherwise satisfactory for its intended purpose. Other objects of this invention will appear from the following detailed description and pointed out in the appended claims.

Transparent foils made from or containing a derivative of cellulose is used to a large extent as wrappers for articles of all kinds. Examples of such articles are confectionery, foodstuffs, such as bread, cakes, crackers or meats; cigars, garments such as dresses, underwear, shirts, etc. In the use of such foil as wrappers, the foil is wrapped around the articles and the loose ends thereof are sealed by the application of a cement, glue or other adhesive.

I have found that the use of the highly volatile solvents, such as acetone, methyl acetate, ethyl acetate, butyl acetate, diethylene dioxide, ethyl lactate, mixtures of chlorinated hydrocarbons and alcohols, etc., which are ordinarily used as adhesives for cellulosic derivative plastics, are entirely unsatisfactory for use as adhesives for thin films or foils of cellulosic derivatives. These substances have a strong solvent action upon the cellulosic derivatives and evaporate rapidly therefore when employed as adhesives for cellulosic derivative foil, cause buckling and wrinkling thereof. Furthermore, these cements possess strong and often unpleasant odors which precludes their use in sealing the wrappers of cigars, candies and foodstuffs.

In accordance with my invention, I employ as adhesives solvents or solvent mixtures having relatively high boiling points, say above 120° C., that are not powerful in solvent action toward the particular cellulose ester contained in the foil or whose strong solvent action had been attenuated by less powerful but compatible substances; that evaporate without causing the formation of wrinkles along the joint; that have little or no odor and that are in liquid state so that it is not necessary to melt the cement before using, as is the case when using glue and gelatin cements. Examples of such solvents or solvent mixtures which I have found satisfactory as adhesives for cellulosic derivative foils are:

| | B. Pt.°/C. |
|---|---|
| Triacetin | 258 |
| Monoethyl ether of ethylene glycol (cellosolve) | 128–137 |
| Diacetone alcohol | 164 |
| Tetrahydro furfuryl alcohol | 177 |
| Diethylene glycol | 240 |
| Monomethyl ether of ethylene glycol (methyl cellosolve) | 125 |

These substances are relatively inexpensive, are easy to apply as they spread as smoothly and as readily as ordinary mucilage and make the surfaces to which they have been applied sufficiently tacky so that a slight pressure of the hand will effect adhesion. The resulting joint, or seal, is flexible and smooth and shows no tendency to come apart when immersed in water or when exposed to heat or cold.

I have discovered that use of triacetin either alone or with 1 to 5 parts of water gives excellent results as an adhesive for cellulosic derivative foil. This compound which is practically odorless produces an almost invisible sealed joint that remains soft, flexible and smooth. Although it is not necessary, a small amount, say 1 to 5%, of pyroxylin or cellulose acetate may be dissolved in the triacetin to give it some body thus making it easier to apply.

Mono-ethyl ether of ethylene glycol, sold under the trade name "Cellosolve", which is regarded as a poor solvent for cellulose acetate, I have found to give good results as an adhesive for cellulose acetate foils in which the plasticizers used have a high solvent power for cellulose acetate. Examples of such plasticizers are dimethyl phthalate, paraethyltoluol sulfonamid, etc. When the plasticizers used do not have a high solvent power for the cellulose acetate, as the aryl phosphates, it is necessary to activate the Cellosolve with 2 to 5% of monomethyl ether of ethylene glycol, sold under the trade name "Methyl Cellosolve", this latter compound being a good solvent for cellulose acetate. Cellosolve is almost odorless and, in order to make it easier to apply, a small quantity of pyroxylin, say 1%, is added thereto to give it body.

The Cellosolve has a strong solvent action on foils made from or containing nitrocellulose which precludes its use as an adhesive for such foils. However, I found that by attenuating the strong solvent action of the Cellosolve by combining therewith slow acting plasticizers such as diethyl phthalate, tricresyl phosphate, etc., satisfactory adhesive mixtures can be produced. The following examples will serve to illustrate some practical applications of my invention, it being understood that they are only illustrative and can be varied widely.

*Example I*

| | Parts |
|---|---|
| Cellosolve | 50 |
| Diethyl phthalate | 50 | or

| | |
|---|---|
| Cellosolve | 25 |
| Diethyl phthalate | 75 |

*Example II*

| | Parts |
|---|---|
| Cellosolve | 50 |
| Tricresyl phosphate | 50 |

More or less of the ingredients may be employed in these examples according to the formula of the foil or to the thickness of the same.

I have also discovered that diacetone alcohol, tetrahydro furfuryl alcohol, diethylene glycol and mono-methyl ether of ethylene glycol, either alone or with suitable amounts of attenuating agents, make satisfactory adhesives for cellulosic derivative foils. These substances form substantially colorless solutions which are odorless or have a weak, pleasant odor.

The above are merely a few of the many compounds which have been found to be satisfactory as adhesives. Other suitable compounds may be employed, among which are: ethylene glycol mono-acetate, esters of mono-ethyl ether of ethylene glycol, cyclo-hexanol and its alkyl substitution derivatives, cyclo-hexanone and its alkyl substitution derivatives, triethanolamine, etc., etc.

It is to be understood that the foregoing detailed description is given merely by way of illustration and that many variations may be made therein without departing from the spirit of my invention.

Having described my invention, what I desire to secure by Letters Patent is:

1. The method of sealing joints between foils of derivatives of cellulose which comprises applying to at least one of the surfaces of the joint a solvent for the cellulose derivative of low volatility and having a weak solvent action, and thereafter bringing the said surfaces into contact.

2. The method of sealing joints between foils of derivatives of cellulose which comprises applying to at least one of the surfaces of the joint a solvent for the cellulose derivative having a boiling point above 120° C. and having a weak solvent action, and thereafter bringing the said surfaces into contact.

3. The method of sealing joints between foils of derivatives of cellulose which comprises applying to at least one of the surfaces of the joint a solvent for the cellulose derivative of low volatility and a substance compatible with the said solvent and adapted to attenuate the solvent action of the said solvent, and thereafter bringing the said surfaces into contact.

4. The method of sealing joints between foils of derivatives of cellulose which comprises applying to at least one of the surfaces of the joint a solvent for the cellulose derivative having a boiling point above 120° C. and a substance compatible with the said solvent and adapted to attenuate the solvent action of the said solvent, and thereafter bringing the said surfaces into contact.

5. The method of sealing joints between foils of nitrocellulose which comprises applying to at least one of the surfaces of the joint a solvent of low volatility and a plasticizer adapted to attenuate the action of the said solvent, and thereafter bringing the said surfaces into contact.

6. The method of sealing joints between foils of derivatives of cellulose which comprises applying to at least one of the surfaces of the joint a solvent for the cellulose derivative selected from the group consisting of triacetin, mono-ethyl ether of ethylene glycol and diacetone alcohol.

7. The method of sealing joints between foils of cellulose acetate having incorporated therein plasticizers of high solvent power which comprises applying to at least one of the surfaces of the joint mono-ethyl ether of ethylene glycol.

8. The method of sealing joints between foils of cellulose acetate having incorporated therein plasticizers of low solvent power which comprises applying to at least one of the surfaces of the joint a solution of mono-methyl ether of ethylene glycol in mono-ethyl ether of ethylene glycol, and thereafter bringing the said surfaces into contact.

9. The method of sealing joints between foils of cellulose acetate which comprises applying to at least one of the surfaces of the joint triacetin and pyroxylin, and thereafter bringing the said surfaces into contact.

10. A liquid jointing composition for sealing joints between foils of derivatives of cellulose consisting essentially of a solvent for the cellulose derivative of low volatility and a substance compatible with the said solvent and adapted to attenuate the solvent action of the said solvent.

11. A liquid jointing composition for sealing joints between foils of derivatives of cellulose consisting essentially of a solvent for the cellulose derivative having a boiling point above 120° C. and a substance compatible with the said solvent and adapted to attenuate the solvent action of the said solvent.

12. A liquid jointing composition for sealing joints between foils of cellulose acetate consisting essentially of a solvent of low volatility and a plasticizer adapted to attenuate the action of the said solvent.

AMERIGO F. CAPRIO.